Figure 1:
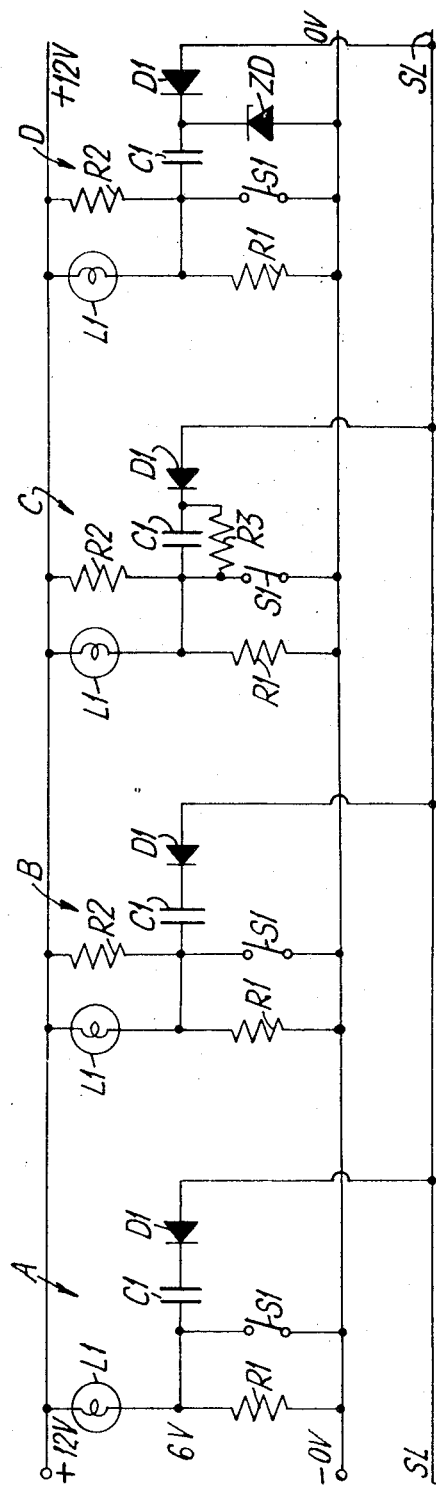
Figure 1:
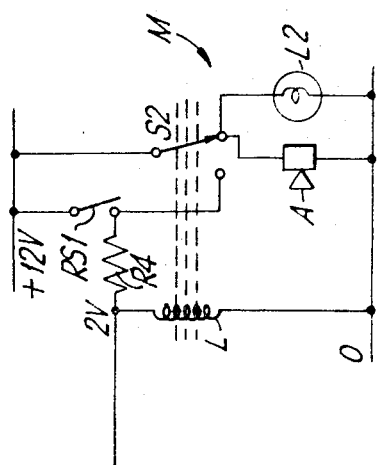

United States Patent

[11] 3,631,432

[72] Inventor John Stallebrass
15 Adam and Eva Mews, London, W. 8, England
[21] Appl. No. 2,868
[22] Filed Jan. 14, 1970
[45] Patented Dec. 28, 1971

[54] ANNUNCIATOR UNIT FOR USE IN A FAULT WARNING SYSTEM
11 Claims, 3 Drawing Figs.
[52] U.S. Cl. .................................................. 340/213.1, 340/213.2
[51] Int. Cl. .............................................. G08b 19/00, G08b 25/00
[50] Field of Search ........................................ 340/213.1, 213.2, 415, 213

[56] References Cited
UNITED STATES PATENTS

| 3,029,421 | 4/1962 | Beguin | 340/213.1 |
| 3,128,456 | 4/1964 | Silliman et al. | 340/213.1 |
| 3,128,457 | 4/1964 | Culbertson | 340/213.1 |
| 3,254,331 | 5/1966 | Ida et al. | 340/213.1 X |
| 3,357,008 | 12/1967 | Walsh | 340/213.1 |
| 3,381,286 | 4/1968 | Walsh | 340/213.1 |
| 3,457,559 | 7/1969 | Hubbard | 340/213.1 |
| 3,480,938 | 11/1969 | Martin | 340/213.1 |
| 3,525,988 | 8/1970 | Linder | 340/412 X |
| 3,529,305 | 9/1970 | Hardin | 340/213.1 |

*Primary Examiner*—Donald J. Yusko
*Attorney*—Holcombe, Wetherill & Brisebois

ABSTRACT: The invention is concerned with annunciator units for use in electrical fault warning systems which can indicate whether certain parameters of a number of pieces of equipment lie within acceptable operating limits or not. The unit comprises a visual indicator and a switch which is normally open but which is arranged to be closed upon a fault occurring and thus causing the visual indicator to be energized. The switch is connected to one side of a capacitor the other side of which is connected through a blocking diode to a signal output for connection to a signal line. The arrangement is such that when the switch is closed the potential on the one side of the capacitor is changed so that an additional charge is drawn as a pulse through the diode to or from the signal line from or to the other side of the capacitor. In use a number of annunciator units are connected to a common master warning unit through common or parallel signal lines and the appearance of the pulse in the signal line operates the master warning unit which can subsequently be reset before the fault has cleared on one annunciator unit so that it is ready to indicate a fault appearing on another annunciator unit.

Patented Dec. 28, 1971

3,631,432

3 Sheets-Sheet 1

ANNUNCIATOR UNIT FOR USE IN A FAULT WARNING SYSTEM

This invention relates to annunciator units for use in electrical fault warning systems which can indicate whether certain parameters of a number of pieces of equipment lie within acceptable operating limits or not. Commonly such a system incorporates a number of annunciator units, each of which is a separate entity which in use is coupled to a corresponding piece of equipment and which gives a visual and/or audible warning when there is a fault on the equipment. Because the warning of a new fault must be insistent, the annunciator unit usually incorporates some form of reset device which enables the operator to accept the fault by switching a part of the circuiting individual to that unit by a local or remote switch so that it thereafter provides a signal in a different mode, until the fault is cleared, or is ready to indicate a further fault. An example of such an annunciator unit is described in my copending application No. 32,912/67.

The reset device in each annunciator unit renders the unit too sophisticated and expensive for some operations and the object of the invention is to provide a simpler system.

In accordance with the invention an annunciator unit for use in a fault warning system is arranged to be coupled to and to indicate a fault occurring on a corresponding piece of equipment, and to give visual warning of such fault occurring, the fault being signalled by a switch which is normally open but which is closed upon a fault occurring to cause the visual indicator to be energized in use, the switch being connected to one side of a capacitor the other side of which is connected through a blocking diode to an output for connection to a signal line, the arrangement being such that in use when the switch is closed the potential on the one side of the capacitor is changed so that an additional charge is drawn as a pulse through the diode to or from the signal line from or to the other side of the capacitor.

With this arrangement, a number of units, each coupled to and monitoring a different piece of equipment, can be connected through a signal line or lines to a common master warning unit which is triggered by the appearance of a pulse in the signal line and then gives a visual and/or audible warning but which can immediately be reset upon acceptance of that warning. Since the appearance of a fault on any one of the annunciator units triggers the master warning unit by means only of a transient pulse, after resetting, the master warning unit is immediately able to accept and indicate the appearance of a fault on another annunciator unit irrespective of the condition of the other units and in particular of whether the fault has cleared on the first unit or not. In practice the operator only has to monitor the indicator of the master warning unit and if this indicator is energized the operator resets the master warning unit to accept the fault. The equipment on which the fault has occurred is obvious from the indicators of the individual annunciator units.

With this arrangement only the master warning unit need be provided with a reset device and the annunciator units can be on extremely simple construction. This master warning reset device may be switched locally, remotely, or if desired from switches in the individual annunciator units.

The visual indicator in each annunciator unit is preferably a lamp and in order to avoid sudden surges of current when the lamp is lit upon closure of the switch, the lamp is preferably in series with a keep warm resistor which divides the potential so that the lamp just glows in the normal condition. The switch will then be in parallel with the keep warm resistor so that when the switch is closed the lamp is energized to its full brightness. Most simply the lamp and keep warm resistor are in series across the full available potential, for example, 12 volt DC. The one side of the capacitor may then be coupled to a tapping between the keep warm resistor and the lamp so that this side of the capacitor is normally maintained at a potential equivalent to the potential across the keep warm resistor. This potential will change in the event of the lamp failing producing a resultant pulse in the signal line and thus giving warning of the lamp failure. The other side of the capacitor is connected through the blocking diode to a signal line leading to the master warning unit and this line is normally held at a potential, for example, of plus or minus 6 volts with respect to earth. When the switch is closed, the potential of the unit side of the capacitor is brought nearer to that of the earth line potential and a pulse of current is drawn to or from the signal line to charge up the capacitor to compensate for this.

In order that a pulse, sufficient to trigger the master warning unit will be produced, even if the lamp in a particular annunciator unit fails, a resistor, is preferably in parallel with the lamp.

When the fault indicated by a particular annunciator unit has been cleared, the unit side of the capacitor is once more restored to its original potential, leaving surplus charge on the line side. This will eventually leak away through inefficiencies in the diode and in the capacitor. However, if the fault reappears while some of this charge remains, a smaller pulse of current will be needed to or from the signal line and this may be insufficient to operate the main warning unit again. To overcome this problem a bleed resistor may be connected in parallel with the capacitor to provide a quicker current leakage path when the fault has cleared. Even then the leakage time will depend upon the time constant of bleed resistor/capacitor circuit and where many units with such resistors are connected to the common line the cumulative effect may upset the action of the master unit. A preferred solution to avoid this is to connect a zener diode to the other side of the capacitor. This zener diode will conduct in a reverse direction any potential on the other side of the capacitor above, say, 6 volts.

The switch in each annunciator unit may be field contacts at the equipment being monitored, or it may be a remote relay, such as a reed relay switch. This has the advantage that the contacts at the equipment, which operate the relay, may be normally closed contacts since this provides a fail safe system at the point of greatest likelihood of failure.

It is to be expected that in many cases a fault appearing on one piece of equipment being monitored by the fault warning system will be related to a substantially simultaneous faults on related equipment on a cause and effect basis. This will result in a visual warning on a number of annunciator units and in order that the basic problem with the pieces of equipment can be diagnosed it is useful to be able to determine which fault was indicated first.

For this purpose each annunciator in the system may be provided with a second visual indicator energized through a silicon-controlled rectifier (SCR) the cathode of which is connected to the switch so that when the switch is closed the SCR is fired and the second visual indicator is energized, the gate of the SCR being connected through a second blocking diode to an input for connection to a first fault signal line connected to one side of a common second capacitor, the arrangement being such that when a fault causes the closure of the switch the cathode potential of the associated SCR falls and a pulse is drawn from the second capacitor through the first fault signal line and through the second blocking diode, the pulse firing the SCR so that both the first and second visual indicators are energized. With this arrangement in a bank of annunciator units, when a first fault causes closure of the switch in one unit, both the first and second visual indicator will be energized in that unit. However, there will be insufficient charge remaining at one side of the second capacitor for firing the SCR of any other units on which subsequent faults may appear until all the faults have cleared, owing to the drain on the circuit caused by the gate to cathode resistor.

When a fault clears on an annunciator unit the switch opens and if the second visual indicator has also been energized as a result of that unit having received notice of the first fault, the opening of the switch produces a potential distribution in the circuit which reverse biases and switches off the SCR and thus both visual indicators are deenergized.

The second visual indicator is also preferably a lamp in series with a keep warm resistor across the full available supply potential so that the SCR is reverse biased when the main switch is open.

The common second capacitor preferably forms part of a pulse reservoir consisting of a resistance network including a pair of resistance chains across the supply potential with the second capacitor connected between tappings in the two resistor chains in the manner of a bridge. The one side of the second capacitor will then be connected directly to the first fault signal line and, in the quiescent state, will be at a higher potential than the other side of the second capacitor. However the other side of the second capacitor should be held at a potential at least as high as that to which the first side of the second capacitor is lowered when a pulse is drawn to fire an SCR when the first fault appears. This ensures that there is insufficient charge left to fire another SCR when the next fault appears on another unit. In order to ensure that the one side of the capacitor cannot have a further charge drawn from it to fire a second SCR a third diode is preferably connected in parallel with the second capacitor.

In some circumstances it may be desirable for the visual indicator in each annunciator unit to be energized in an insistent mode when a fault first appears on the corresponding equipment and in a less insistent mode upon acceptance of that fault. To meet this requirement, the side of the switch in the annunciator unit remote from the capacitor and diode is connected through two parallel lines one to an input for a discontinuous connection to earth and the other through a silicon-controlled rectifier (SCR) to earth, such that when the switch closes in use, a pulse is repeatedly drawn through the diode from the signal line and the visual indicator is repeatedly energized, the unit being associated with an acceptance switch which when closed following closure of the first switch causes the SCR to be fired so that the capacitor and visual indicator are subjected to a constant potential whereafter no further pulses can be drawn from the signal line and the visual indicator is steadily energized the acceptance switch also being connected to an output for connection to a reset device whereby in use, the reset device will be operated when the acceptance switch is closed.

With this arrangement a bank of annunciator units can be discontinuously connected to earth and through a reset line or lines to the common master warning unit. When a fault appears on one annunciator unit its visual indicator will flash and a succession of pulses will be fed through the signal line to operate the indicator of the master warning unit. The fault can be accepted by closing an individual acceptance switch incorporated in that unit whereafter its visual indicator will indicate in a steady mode and at the same time the master warning unit will be automatically reset through potential applied through the reset line. It will however be reenergized immediately by any other annunciator units which are flashing and which have not been acknowledged and so remains energized until all flashing units have been acknowledged. It is also possible to have a common acceptance switch for several units which causes all the SCR's to be triggered so that all units then flashing are simultaneously acknowledged to steady. This has the advantage that if faults have been accepted on a number of annunciator units the operator will immediately recognize on which unit a further fault appears after his attention has been attracted by reenergization of the indicator of the master warning unit.

Some fault warning systems incorporating the invention are illustrated by way of example in the accompanying drawings which are circuit diagrams.

FIG. 1 shows four annunciator units A,B,C and D coupled to a master warning unit M. Four different modifications of annunciator unit are used although it will be appreciated that in practice they would usually all be the same and they could equally well be more or less than four in number.

The unit A has a keep warm resistor R1 in series with an indicator lamp L1. The resistive values of R1 and L1 are such that one side of a capacitor C1 is maintained at a potential of about 6 volts. A switch S1 is in parallel with the resistor R1. A protective diode D1 is coupled between the other side of the capacitor and a common signal line SL which connects all the annunciator units with the master warning unit M and is maintained at a potential of about 6 volts.

When a fault occurs on the equipment to which the unit A is coupled, the switch S1 is closed so that the lamp L1 is connected across the full potential and is energized from a glowing condition to full brightness. At the same time the one side of the capacitor C1 has its potential reduced to zero and since the other side of the capacitor is connected to the signal line SL a pulse providing at least a 6 volt change of differential across the capacitor C1 is drawn through the diode D1. The pulse is reflected at the master warning unit M and energized the unit. When the fault clears the switch S1 reopens again.

The unit B is modified in having another resistor R2 in parallel with the lamp S1 so that in the event of failure of the lamp, the unit will still function and produce a pulse to operate the master warning unit.

The unit C has a bleed resistor R3 in parallel with the capacitor C1 in order to provide a leakage path for the additional charge on the other side of the capacitor so that the unit is more quickly ready to produce a pulse to operate the main warning indicator when the fault reappears.

The unit D has, instead of the resistor R3, a zener diode ZD which provides an even better leakage path for the extra charge on the other side of the capacitor C1, when the fault is cleared, to maintain the other side of the capacitor at a potential of about 6 volts.

The master warning unit M has a coil L in series with a resistor R4 to maintain a potential of 6 volts on the signal line SL. Normally a two-way switch S2 is held in its alternative position by the field from the coil L, thus keeping the coil energized. When a pulse in the signal line deenergizes the coil momentarily, the relay is broken and the switch S2 changes over to the illustrated position and causes energization of a master warning indicator, in the form of a lamp L2 and an audible warning device A, a reset switch RS, is momentarily closed to reenergize the coil L and reset the relay.

Appropriate values of the components are as follows:
R1=75Ω
R2=430Ω
R3=40 kΩ
C1=50 µf.
L1=12v. 1W.

In this example the system may be inverted by interchange of the positive and negative supply lines and reversal of all polarized components such as the diodes, and zener diodes. This is useful if the system is to be provided with a positive earth.

Figure 2:
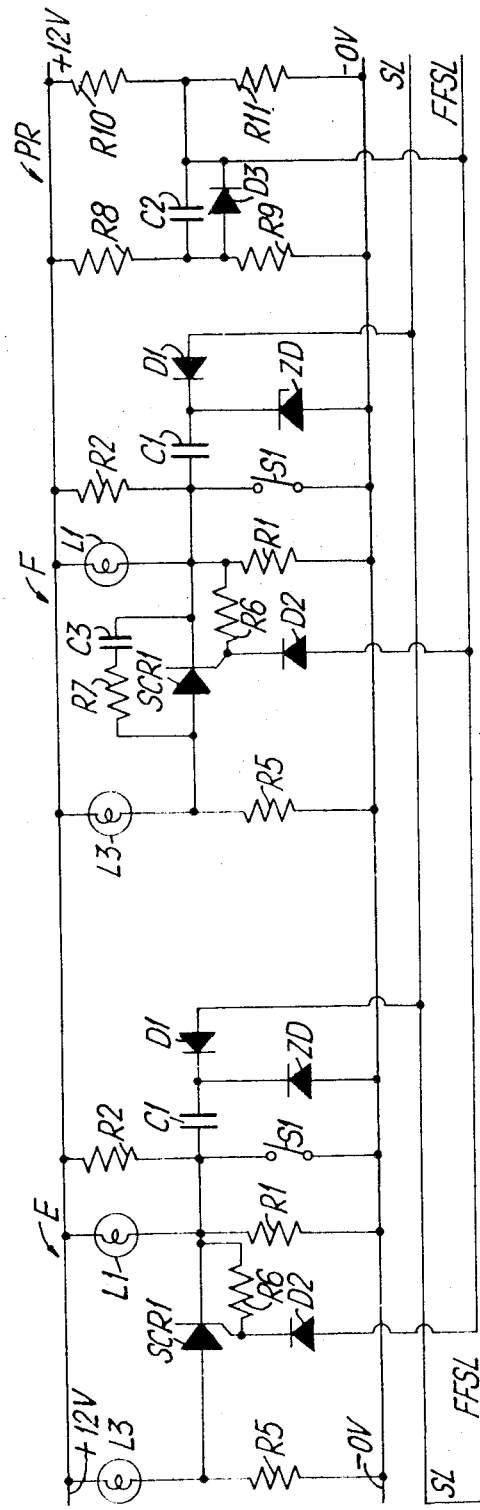
Figure 2:
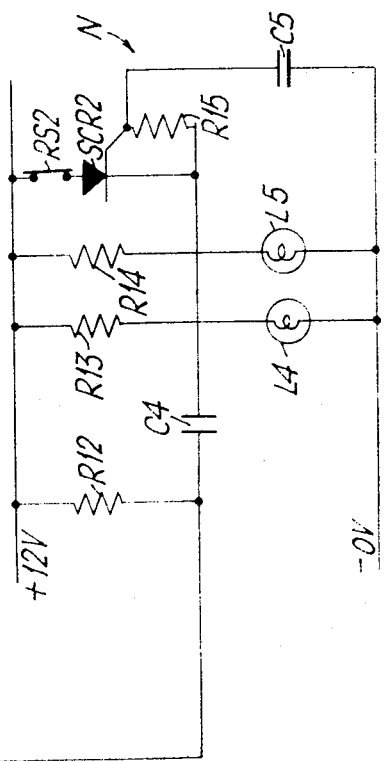

FIG. 2 shows a system with two annunciator units E and F. The unit E is identical to the unit D of FIG. 1 with further improvements and the unit F is identical to the unit E with the addition of further improvements. As before any number of annunciator units could be provided.

The additional improvement in unit E lies in the provision of a second visual indicator lamp L3 in series with a keep warm resistor R5 and also in separate series with a silicon-controlled rectifier SCR 1 the gate of which is connected to the switch S1 at the tapping between the lamp L1 and keep warm resistor R1. The gate of SCR1 is connected through a blocking diode D2 to a first fault signal line FFSL which is common to all the units and through a resistor R6 to the cathode. The modification in unit F is that a resistor R7 and capacitor C3 are connected across the anode and cathode of SCR1 to smooth transient pulses across the SCR and prevent its being fired inadvertently. The line FFSL is coupled to one side of a second capacitor C2 in a pulse reservoir PR which is common to all the units. This pulse reservoir includes a resistance network R8, R9, R10 and R11 across which the capacitor C2 is connected as a bridge. A diode D3 is connected in parallel with the second capacitor C2 to prevent reverse discharging of that capacitor.

In the event of a fault occurring on equipment which one of the annunciator units is monitoring, the switch S1 in the unit closes and, as in the FIG. 1 example, the lamp L1 is energized. At the same time a pulse is drawn by the first capacitor C1 from the signal line SL and this is reflected to operate a master warning unit, in this case N. However in this case the side of the one capacitor C2 connected to the line FFSL is, in the quiescent state, held at a potential of about 4 volts. When the first fault appears in one of the annunciator units, and its switch S1 closes, its cathode is reduced to zero potential and a pulse is drawn from the one side of the capacitor C2 through the line FFSL and the diode D2 in the corresponding annunciator unit to the gate of the SCR1 which is fired and then conducts so that the lamp L3 which was only previously glowing is now energized. The SCR1 remains in its conducting state until the corresponding switch S1 is reopened again.

The other side of the capacitor C2 is held at a potential of about one-half volt and this is sufficient to prevent a further pulse being drawn from the one side of the capacitor C2 to fire SCR1 of the next annunciator unit on which a fault occurs since it is now connected to zero potential via the gate to cathode resistor R6 and switch S1 of the first and any other units showing faults. Thus in the event of a number of faults occurring in a short interval, the lamps L1 of each unit will be energized indicating on which equipment faults have occurred, but only the lamp L3 of the unit on which the first fault occurred will remain energized.

In this example the master warning unit N consists of a resistor R12 and capacitor C4 which maintain a voltage of about 6 volts on the signal line SL. In thus master unit there are two master visual indicators in the form of lamps L4 and L5 each in series with its own keep warm resistor R13 and R14 respectively across the full supply voltage. The purpose of having duplicate indicating lamps is that if one of them fails the other sees the two keep warm resistances in parallel and glows more brightly to indicate that one of the lamps has failed without being energized to such an extent that the appearance of a fault on one of the annunciator units is indicated. The unit N contain another silicon-controlled rectifier SCR2 the gate of which is connected to the negative line through a capacitor C5 and which is nonconducting in the quiescent state. In the event of a pulse appearing on the signal line SL, as a result of a fault appearing in one of the annunciator units, the pulse passes through the capacitor C4 and momentarily reduces the potential at the cathode end of the gate cathode resistor R15. As a result the gate of SCR2 is momentarily positive relatively to the cathode of the SCR2 so that the SCR is fired and shorts out the keep warm resistors R13 and R14 causing energization of the lamps L4 and L5. The fault is acknowledged and the master warning unit is reset by opening a reset switch RS2 which immediately unlatches SCR2.

Appropriate values of the components not already appearing on FIG. 1 are as follows:
L3=12v. 1 W.
R5=75Ω
R6=240Ω
R7=10Ω
R8=10 kΩ
R9=500Ω
R10=40 kΩ
R11=20 kΩ
R12=1 kΩ
R13=240Ω
R14=240Ω
R15=750Ω
C2=10 μf.
C3=5,000 pf.
C4=25 μf.
C5=25 μf.

Figure 3:
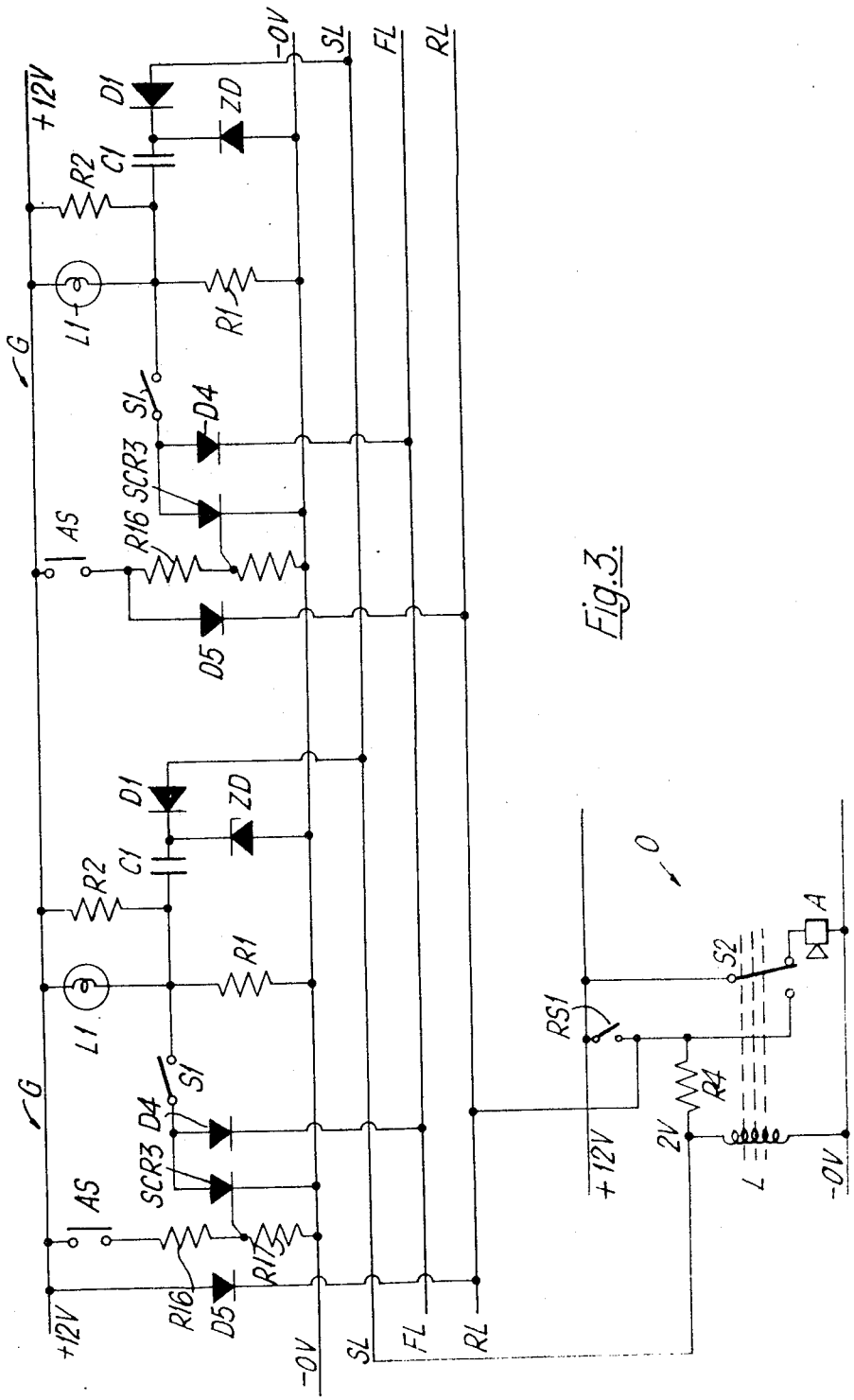

FIG. 3 shows a system with two similar annunciator units G. Each unit G is identical to the unit D of FIG. 1 with further improvements and although two units are shown in conjunction with a common master warning unit 0, any number of annunciator units G could be provided. The master warning unit 0 is substantially identical to the unit M of FIG. 1 except that it is only necessary in this example to provide an audible master warning indicator A.

In this case the switch S1, which is closed when a fault appears on the corresponding equipment is directly equivalent to the switch S1 of FIG. 1 except that instead of being connected to the negative line it is connected through a diode D4, which prevents commutation of a silicon-controlled rectifier SCR3 to be described, to a common line FL which is alternately connected to earth and open circuit. As before when the switch S1 closes, a pulse, but this time a repeating pulse, is drawn from the line SL through the diode D1 and the capacitor C1 and this is reflected at and operates the indicator A in the master warning unit 0. At the same time the indicator lamp L1 in the corresponding annunciator unit G flashes.

The operator, whose attention is drawn first by the indicator A and then by the flashing lamp L1 of the particular annunciator unit G corresponding to the equipment where the fault has occurred, can accept the fault on that annunciator by closing an acceptance switch AS which may be a pushbutton. This places the gate of the previously mentioned silicon-controlled rectifier SCR3 at a potential set by resistors R16 and R17 such that SCR3 fires and conducts so that the lamp L1 changes to a steady mode of illumination and no further pulses are drawn from the line SL. At the same time a line RL, common to all the units G, is connected to the positive line through a diode D5. The line RL is connected to the master warning unit 0 and effectively bypasses the reset switch RS1 so that the unit 0 is automatically reset. When the fault clears, the switch S1 will reopen and the system will be ready for a new cycle.

The advantage of the FIG. 3 improvement is that if a number of faults have been accepted but have not cleared on a number of units G, the appearance of a fault on another unit, indicated in the first instance by the energization of the master warning indicator A will immediately enable the operator to recognize on which equipment the further fault has occurred because, amongst the number of lamps L1 which are glowing steadily the new fault will show as a flashing mode of the lamp L1 of the corresponding unit G.

Appropriate values of the components not already appearing in FIG. 1 are as follows:
R16 is 1 kΩ
R17 is 270 Ω

I claim:
1. In a fault warning system comprising a plurality of subannunciator units, a master annunciator unit, and a common signal line connecting each subannunciator unit to the master annunciator unit, the improvement wherein
each subannunciator unit comprises in series a normally open switch and a visual indicator connected between a relatively positive and a relatively negative power supply line, whereby closure of the switch energizes the indicator, the junction between the switch and the indicator of each subannunciator unit being connected in series through a capacitor and a normally reverse-biased diode to said common signal line, a resistance being connected in parallel with the switch, whereby closure of the switch in response to a fault at a unit causes a drop in voltage at said junction which momentarily forward biases said diode to cause a transient pulse on the common signal line, and
where said master unit comprises an actuator energized by any such transient pulse along the common signal line resulting from the closure of the switch in any one of the subunits, and means responsive to the energization of the actuator for closing a switch of the master unit to energize a master indicator.

2. A system according to claim 1, in which the side of the switch in each subannunciator unit remote from the capacitor and diode is connected through two parallel lines, one of said parallel lines providing a periodic connection to earth, and the other of said parallel lines providing a connection through a silicon-controlled rectifier to earth, whereby when the switch closes in use, a pulse is periodically drawn through the diode from the signal line and the visual indicator is periodically energized, the system further comprising an acceptance switch connected so that, when closed following closure of the first switch, the acceptance switch causes the silicon-controlled rectifier to be fired, whereby the capacitor and visual indicator are subjected to a constant potential so that thereafter no further pulses can be drawn from the signal line and the visual indicator is steadily energized, the acceptance switch also being arranged to be connected to a reset device operated when the acceptance switch is closed.

3. A system according to claim 2 wherein the master warning unit has reset means for selectively being reset with respect to an indication of the closure of a switch in any subannunciator unit before the switch in that subannunciator unit has reopened and wherein the signal line is at a positive potential and said reset means is operated upon closure of said acceptance switch.

4. A system according to claim 3, wherein each annunciator unit has its own acceptance switch connected to the reset device in the master unit through a reset line.

5. A system according to claim 1 wherein each subannunciator unit is provided with a second visual indicator energized through a silicon-controlled rectifier including an anode, a cathode, and a gate, said cathode being connected to the switch, whereby, when the switch is closed, the silicon-controlled rectifier is fired and the second visual indicator is energized, said gate being connected through a second blocking diode to an input from a first fault signal line connected to one side of a common second capacitor, whereby, when a fault causes the closure of the switch, the cathode potential of the associated silicon-controlled rectifier falls and a pulse is drawn from the second capacitor through the first fault signal line and through the second blocking diode, the pulse firing the silicon-controlled rectifier so that both the first and second visual indicators are energized.

6. A system according to claim 5 wherein the signal line is at a positive potential and the subannunciator units are connected to the common second capacitor through at least one first fault signal line, whereby, when a first fault causes the energization of the first and second visual indicators of any one subannunciator unit, there is then insufficient charge remaining at said one side of the second capacitor ro fire the silicon-controlled rectifier of any other subannunciator unit on which a subsequent fault appears until all the faults have cleared.

7. A system according to claim 6, in which the common second capacitor forms part of a pulse reservoir additionally comprising a resistance network including a pair of resistance chains across the supply lines with the second capacitor connected between tappings in the two resistor chains in the manner of a bridge.

8. A system according to claim 7, further comprising a third diode connected in parallel with the second capacitor, whereby to ensure that said one side of the capacitor cannot have a further charge drawn from it to fire a second silicon-controlled rectifier in any other subannunciator unit after said one subannunciator unit is energized in response to said first fault.

9. A system according to claim 5, wherein the second visual indicator comprises a lamp in series with a keep-warm resistor, connected between said relatively positive and relatively negative supply lines, the junction between said lamp and said keep-warm resistor being connected to said anode.

10. A fault warning system according to claim 1, wherein the master unit has reset means for selectively being reset with respect to an indication of the closure of a switch in any subannunciator unit before the switch in that subannunciator unit has reopened.

11. A system according to claim 1 further comprising an additional resistor connected in parallel with said visual indicator, whereby a pulse will be provided on the common signal line even if the visual indicator fails by becoming open circuited.

* * * * *

UNITED STATES PATENT OFFICE
CERTIFICATE OF CORRECTION

Patent No. 3,631,432   Dated December 28, 1971

Inventor(s) JOHN STALLEBRASS

It is certified that error appears in the above-identified patent and that said Letters Patent are hereby corrected as shown below:

[32]  Priority  January 24, 1969
[33]            Great Britain
[31]            4166/69

Signed and sealed this 4th day of July 1972.

(SEAL)
Attest:

EDWARD M. FLETCHER, JR.        ROBERT GOTTSCHALK
Attesting Officer              Commissioner of Patents